United States Patent [19]
Hoffmann

[11] Patent Number: 5,982,884
[45] Date of Patent: Nov. 9, 1999

[54] CASING FOR A CORDLESS TELEPHONE, AND ASSEMBLY OF A CASING WITH A CORDLESS TELEPHONE

[75] Inventor: Stephanie Hoffmann, Le Mans, France

[73] Assignee: U.S. Philips Corporation, New York, N.Y.

[21] Appl. No.: 08/988,514

[22] Filed: Dec. 10, 1997

[30] Foreign Application Priority Data

Dec. 13, 1996 [EP] European Pat. Off. .............. 96402736

[51] Int. Cl.[6] ..................................... H04M 1/00
[52] U.S. Cl. ........................ 379/446; 379/454; 379/455
[58] Field of Search .................................. 379/446, 455, 379/426, 454; 248/676

[56] References Cited

U.S. PATENT DOCUMENTS

| | | | |
|---|---|---|---|
| 4,259,568 | 3/1981 | Dynesen | 248/676 |
| 4,837,590 | 6/1989 | Sprague | 346/145 |
| 5,533,097 | 7/1996 | Crane et al. | 379/58 |
| 5,610,979 | 3/1997 | Yu | 379/455 |

FOREIGN PATENT DOCUMENTS

4041988A1   7/1992   Germany .................. H04M 1/02

*Primary Examiner*—Jack Chiang

[57] ABSTRACT

A cordless telephone is accommodated in a casing having a base and a lid movable relative thereto, between which a storage space for the telephone is formed. The casing is provided with one or several attachments connected to the telephone such as a spare battery, a battery charging device, one or several connectors for electrically connecting the telephone, an answering machine, a modem, a computer, interface means for connection to an external computer, or an audio amplifier with a microphone and a loudspeaker.

9 Claims, 4 Drawing Sheets

CASING FOR A CORDLESS TELEPHONE, AND ASSEMBLY OF A CASING WITH A CORDLESS TELEPHONE

BACKGROUND OF THE INVENTION

The invention relates to a casing for a cordless telephone.

The invention also relates to an assembly of a casing with a cordless telephone.

Such telephones are increasingly used for communication, for example, via a cellular network such as the NTM or GSM network. The telephone is carried by the user in that case, for example in a coat pocket, or in a purse or briefcase. It is important then that the telephone should be quickly accessible, for example for answering a telephone call, but also that it is well protected from external influences such as dust and dirt, inadvertent pressing of certain keys, dropping and impacts, etc., during transport. Practical prior art casings for cordless telephones are known in the form of, for example, sleeve-type cases which are provided around the telephone by means of a zipper.

OBJECTS AND SUMMARY OF THE INVENTION

It is an object of the invention to improve a casing of the kind mentioned in the opening paragraph such that the telephone is excellently protected from external influences, while at the same time the functionality of the casing is enhanced.

The casing according to the invention is for this purpose characterized in that the casing comprises a base and a movable lid with a storage space for the telephone therebetween, and in that the casing is provided with at least one of the following facilities: a spare battery for the telephone, a telephone battery charging device which can be connected to a supply source such as the mains and/or a car battery, a connector for the electrical connection of the telephone, an answering machine, a modem, a computer, interface means for connection to an external computer, an audio amplifier with a microphone and a loudspeaker.

The design of the casing according to the invention in the form of a base with a movable lid with a storage space for the telephone therebetween is capable of providing a sturdy, box-type casing which forms a safe storage for the telephone. The casing may at the same time be advantageously fitted with a number of provisions which in an inventive manner utilize the presence of the base and of the movable lid for giving the casing and/or the telephone-casing combination some completely new functions. This renders the casing according to the invention particularly suitable for use in the office, during business meetings, during travel, in a hotel room, in a car, in short in all those cases where a businessman uses a cordless telephone. The casing according to the invention may thus also serve for the safe storage of a spare battery for the telephone, the period of use of the telephone being extended by the exchange of the battery. The provision of a battery charging device in the casing according to the invention renders it possible to charge the battery present in the telephone or the spare battery present in the casing from the mains or from a car battery. If so desired, the spare battery and the battery present in the telephone may be charged simultaneously. A connector may be provided in the casing in a sturdy and stable manner for the electrical connection of a telephone. The battery charging device, for example, may be connected to the battery of the telephone via said connector. The connector may alternatively serve for various electrical connections to circuits present in the telephone. Thus the telephone may be connected to a modem for rendering data communication possible. A miniaturized computer may be present in the casing for this purpose, or the casing may be connected to an external computer via interface means present on the casing, for example connectors provided permanently on the casing. Another convenient facility which renders the telephone useful also when the owner is temporarily absent is an answering machine incorporated in the casing. The above enumeration of provisions which may be fitted in the casing is not meant to be limitative; it may be expanded with any other provisions which are suitable for enhancing the functions of the casing or the combination of casing and telephone.

An interesting embodiment of the casing is characterized in that the base and the lid are interconnected by means of a hinge device adjacent a side of the casing, in that the lid can be hinged open at the hinge device relative to the base through an angle of at least substantially 270°, in that the casing can be placed on a bottom surface in a stable manner with the lid hinged open and at least substantially in a vertical position and with the base resting on the bottom surface, and in that, with the lid hinged open, the telephone can be placed in a stable manner in the hinged-open lid. The use of a hinge device renders it possible to interconnect the base and the lid of the casing indetachably and securely in a known manner. A feature of this embodiment of the invention is that the lid can be hinged open through substantially 270° and the base is so constructed that it can be placed with its open side on a bottom surface with the lid hinged open, for example on a desk or table surface. The lid then is in vertical position and serves as a support for a telephone placed therein. In this situation, the casing may very well serve as a charging device, while the telephone in its vertical position can be easily taken out, and while in addition the front thereof is visible. The display, which is normally present at the front of the telephone in the case of cordless telephones, is thus readily observable. The telephone may accordingly be easily used in this situation with the acoustic signal switched off and with an optical signaling of the presence of any call signal being switched on. This renders the telephone placed in its casing according to the invention suitable, for example, for use during meetings when acoustic signals are undesirable.

Another embodiment of the invention is characterized in that the casing is provided with a connector which is present adjacent the hinge device, and in that the telephone, when placed in the hinged-open lid, can be electrically coupled to said connector. It can be ensured through a suitable construction of the telephone and of the connector present adjacent the hinge device that, provided the casing is connected to a voltage source such as the mains or a car battery, the telephone in the casing is charged, whether or not with the lid hinged open.

BRIEF DESCRIPTION OF THE DRAWINGS

The invention will now be explained in more detail with reference to the drawing of an embodiment of the invention, to which the latter is not limited, where.

Corresponding parts have been given the same reference numerals in the Figures.

DETAILED DESCRIPTION OF THE PREFERRED EMBODIMENT

Figure 1:
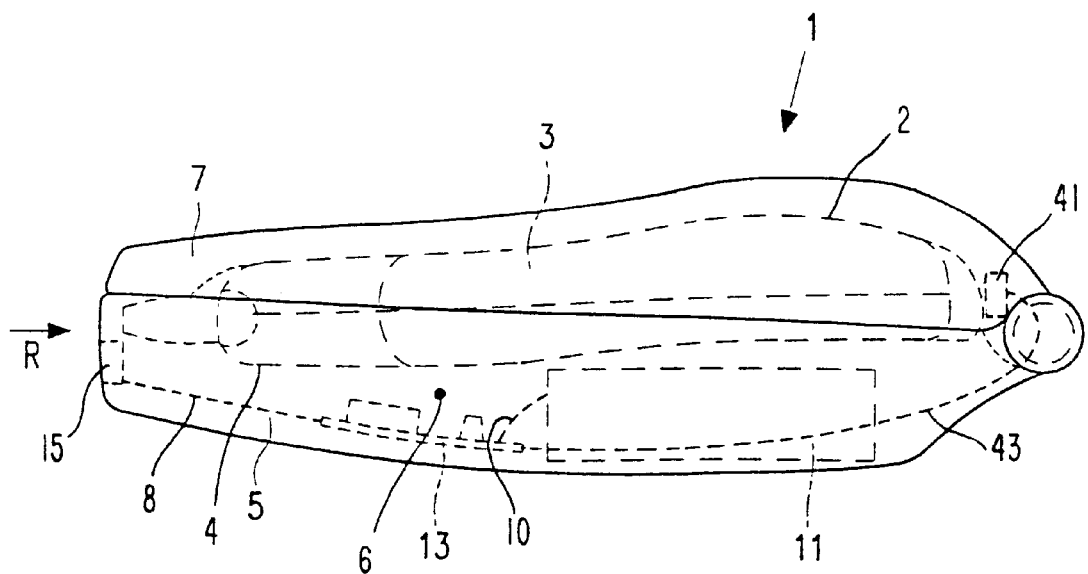
FIG. 1 is a side elevation of one of the sides of the casing in the closed state.

The Figures show a casing with the general reference numeral 1 for a cordless telephone 3. The casing 1 is provided with a base 5 and a movable lid 7 with a storage space 9 for the telephone 3 therebetween and is made, for example, from metal or synthetic resin.

According to the invention, the casing may be provided with one or several features of which a few are shown diagrammatically only in the drawing. As FIG. I shows, for example, a spare battery 11 for the telephone may be present in the base. This battery may be connected to a miniaturized battery charging device 13. The exact embodiments of any components of this kind which may be present have not been shown in any detail in the Figures, they belong, however, to groups of known components which may be fitted in the casing in any suitable manner known to those skilled in the art. The wiring for the electrical interconnections of the provisions present in the casing have also not been drawn, because they are also in general use and their construction is not regarded as essential to the invention. A connector 15 may be present at the rear of the base 5, by means of which, for example, the battery charging device 13 can be connected to the mains or a car battery. Further connectors may also be present in the casing, see in particular FIG. 4, where a number of connectors 17–23 is indicated diagrammatically only, connector 17 being a multipole connector and connector 18 a coax connector. Furthermore, a slide 25 is present in the drawing, capable of movement to the right, behind which slide further connectors may be present. Some of these connectors, such as the connector 17 or the connector or connectors provided behind the slide 25, may form part of interface means for connecting the casing to an external computer.

Figure 4:
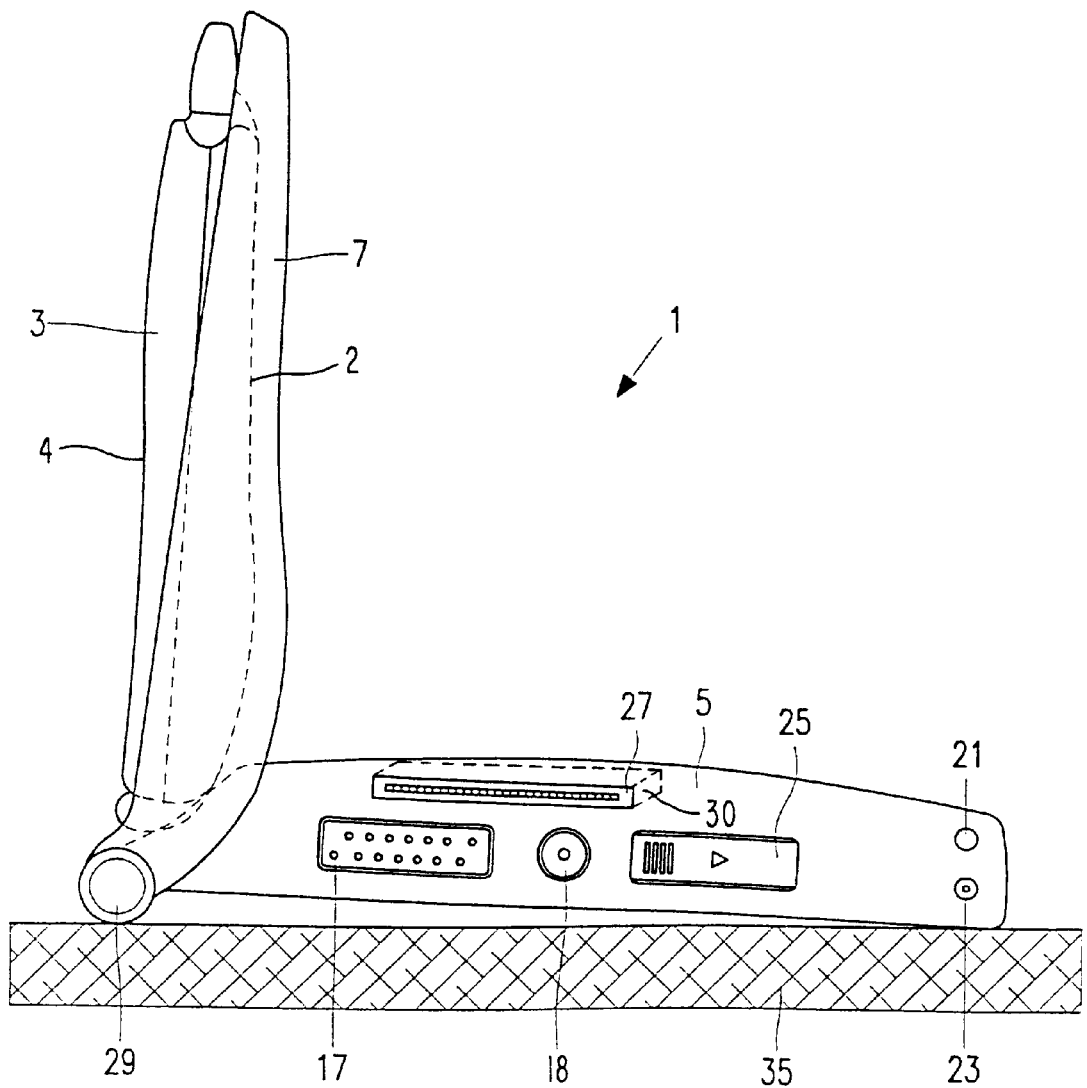
FIG. 4 shows the casing of the preceding Figures in the hinged-open state in a side elevation opposed to that of FIG. 1, with a telephone placed in the lid.

In FIG. 4, furthermore, a slot 27 is present for inserting a PCMCIA card, for example comprising a miniaturized modem, into the casing. This modem may be connected both to the telephone and to an external computer via suitable circuits present in the casing and the interface means mentioned above. If so desired, a miniaturized dedicated computer of a suitable kind may be present inside the casing. Possible further provisions, such as an answering machine by means of which incoming calls for the owner of the telephone can be stored, or an audio amplifier wtih a microphone and a loudspeaker for a hands-free function, have not been drawn. The loudspeaker could be mounted, for example, in the lower wall of the base 5 which faces upwards in FIG. 4. The microphone could also be accommodated there, or in some other suitable location.

Figure 2:
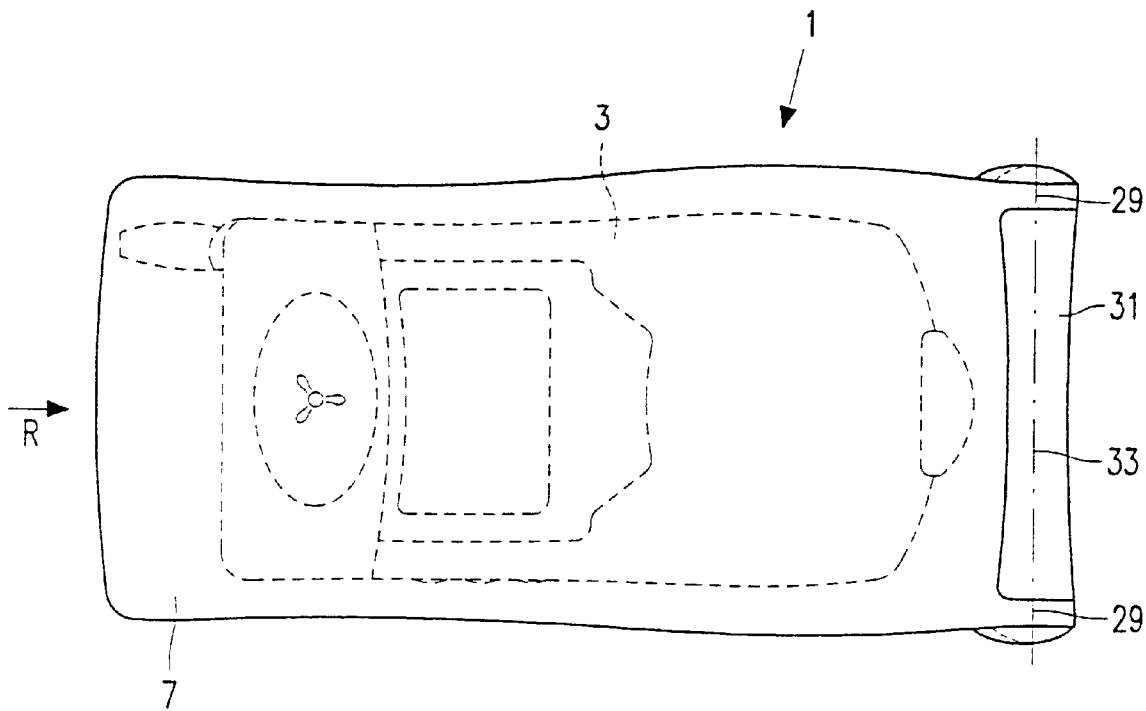
FIG. 2 shows the casing of FIG. 1 in the closed state in plan view.

The base 5 and the lid 7 are interconnected by means of a hinge device at the side of the casing which is on the right in FIGS. 1 and 2 and on the left in FIG. 4. The hinge device comprises two extensions 29 belonging to the lid 7 and an interposed part 31 belonging to the base 5. The lid 7 is pivotable relative to the base 5 about a pivot axis 33, see FIG. 2, by means of these parts and other hinge parts which are not shown and which are known per se. The lid 7 can be hinged open relative to the base at the hinge device 29, 31 through an angle of at least substantially 270°, see FIG. 2. With the lid 7 hinged open, the casing can be placed on a support surface 35, such as a table top or desk, in a stable manner. The base 5 then lies on the support surface 35 and the lid 7 is at least substantially vertical. The telephone 3 can be placed in the hinged-open lid 7 in a stable manner in this situation. A few locating lugs 37 and 39 are present for this purpose, indicated diagrammatically in FIG. 5.

Figure 3:
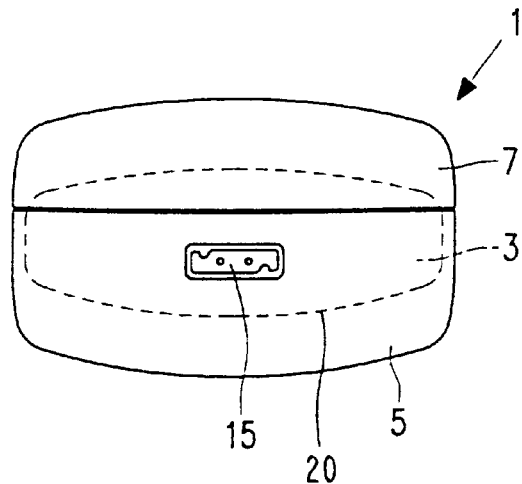
FIG. 3 is an elevation taken along the arrow R in FIGS. 1 and 2.
Figure 5:
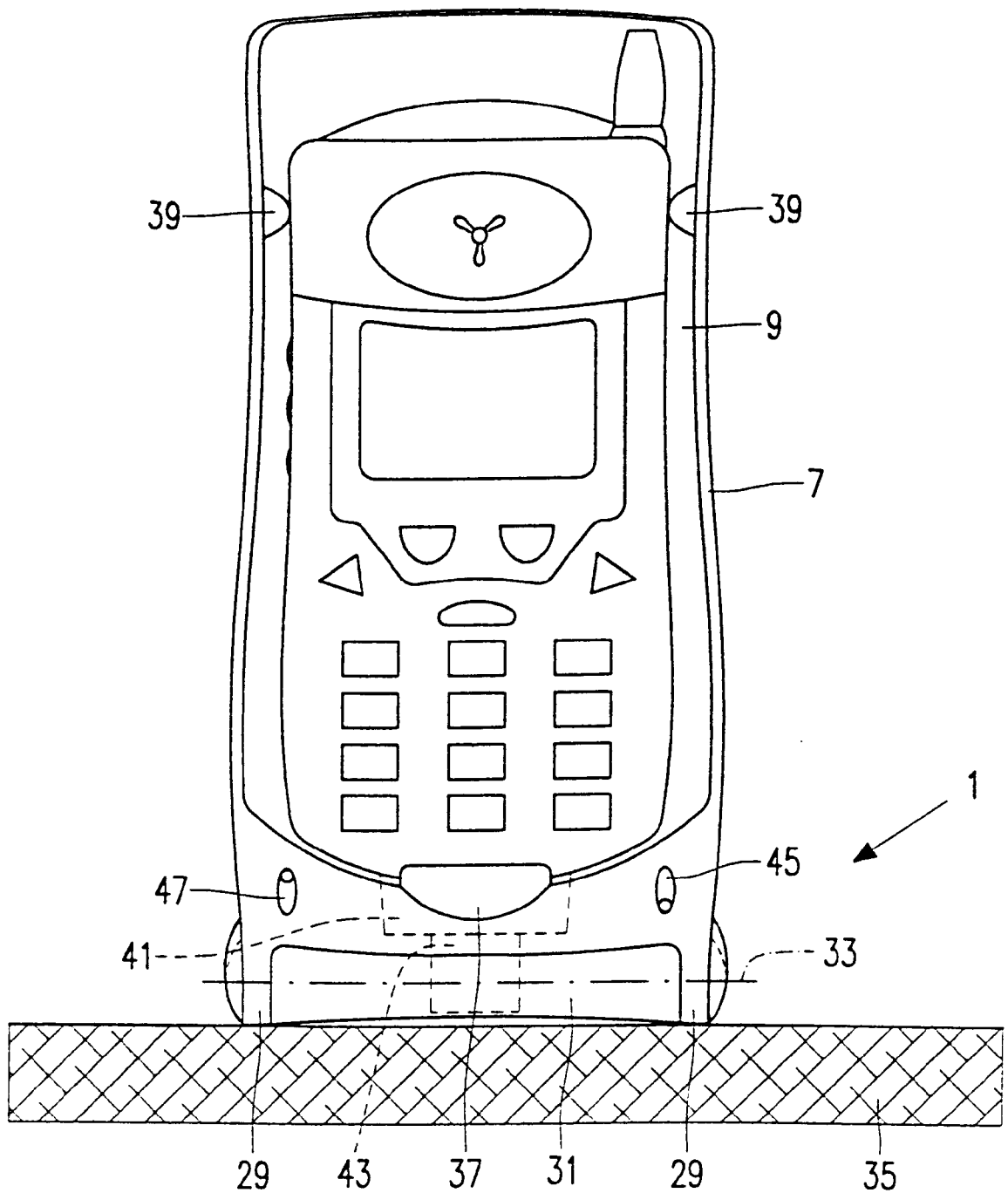
FIG. 5 is a front elevation of the casing in the hinged-open state of FIG. 4, viewed towards the telephone placed in the lid.

FIG. 5 shows that the casing is provided with a further connector 41 present adjacent the hinge device 29, 31, and that the telephone is coupled to the connector 41 in the hinged-open lid 7. The connector is indicated diagrammatically only and may also be present in an alternative suitable location where it can be electrically coupled to the telephone, in dependence on the placement of the corresponding connection contacts of the telephone 3. The connector 41 may be electrically connected to circuits present inside the casing, for example via a so-called flexfoil 43, for example to the battery charger 13 or to other units present such as a modem, an audio amplifier, or an answering machine. FIG. 5 also shows two LEDs 45 and 47 which in the situation shown in FIGS. 4 and 5, when the telephone 3 is connected to the charging device 13 via the connector 41, provide an indication on the degree of charging of the battery present in the telephone 3. Further shown in FIG. 1 are the connectors 15 and 41 as shown in FIG. 3 and FIG. 5, respectively, and the flexcoil 43 as shown in FIG. 5. In FIG. 1, a back face 2 and a front face 4 of the telephone 3 are shown, and further a space 6 below the front face 4, the space 6 extending in the base 5. Also shown in FIG. 1 are electrical leads 8 and 10 for electrically connecting the connector 15 to the charging device 13 and for electrically connecting the charging device 13 to the spare battery 11.

Further shown in FIG. 3 is an inner bottom surface 20 of the base 5.

Further shown in FIG. 4 are the front and back faces 4 and 2 of the telephone 3, and a miniaturized modem card 30.

Figure 6:
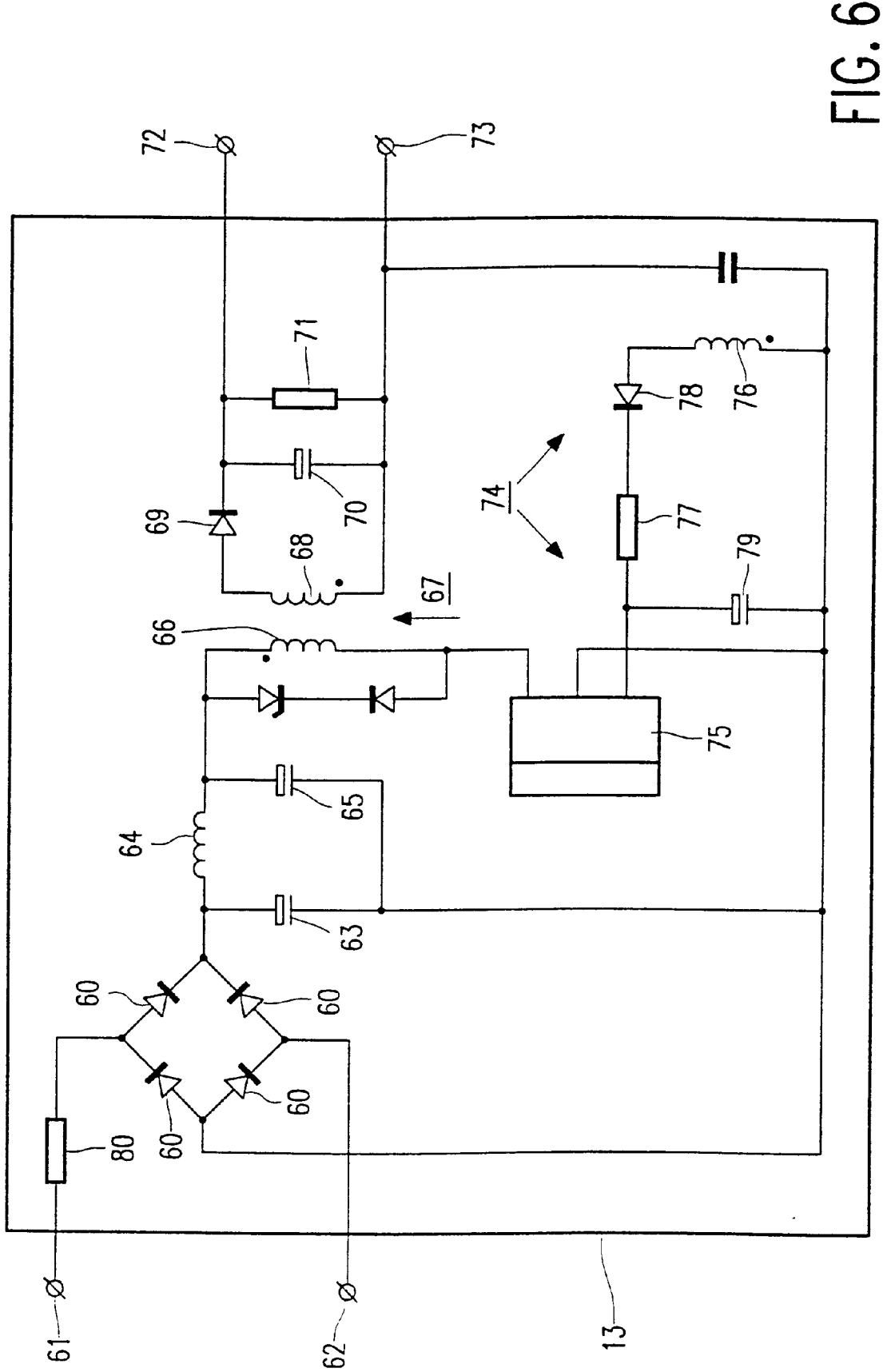
FIG. 6 shows a battery charging device for use in the casing.

FIG. 6 shows an example of the battery charging device 13 for use in the casing 1. The charging device 13 comprises a diode bridge 60 which can be connected to the mains via connection terminals 61 and 62. The diode bridge 60 is coupled by its output to an interference suppression filter formed by a capacitor 63, a coil 64, and a capacitor 65. The output of the interference suppression filter is coupled to a primary winding 66 of a transformer 67 whose secondary winding supplies an output voltage which is to be rectified. A battery charging voltage is obtained at output terminals 72 and 73, after rectification by means of a diode 69 and smoothing by means of a low-pass filter formed by a capacitor 70 and a resistor 71. A control circuit 74 is also shown, which is to keep the battery charging voltage as constant as possible. The control circuit comprises a control IC ("Integrated Circuit"), for example a commercially available controlled switch 75. The battery charging voltage measured by a measuring winding 76 of the transformer 67 is supplied to the control switch 75. A control circuit operating on the feedback principle is obtained thereby. A resistor 77, a diode 78, a capacitor 79, and a resistor 80 are also shown.

Although the invention was illustrated in the drawing with reference to a single embodiment, the invention is by no means limited thereto and covers each and every embodiment within the scope of the appended claims. The provisions mentioned and shown are not limitative; indeed, they may be augmented or replaced by alternative useful provisions with alternative useful functions such as alarm functions, the coupling to further telephones, etc.

LIST OF REFERENCE NUMERALS 1 casing
3 telephone
5 base
7 lid
9 storage space
11 spare battery
13 charging device
15 connector
17–23 connectors
25 slide
27 slot for PCMCIA-card
29 extension
31 interposed part
33 pivot axis
35 support surface, table top
37, 39 locating lugs
41 connector
45, 47 LED

I claim:

1. A casing for a cordless phone, said casing comprising:
a base, a movable lid, and a hinge device at a side of said casing for interconnecting said base and said movable lid,
said base and said movable lid each being formed as a single part,
said hinge device being pivotable between a first position in which said movable lid covers said base and a second position in which said movable lid is hinged open relative to said base through an angle of at least substantially 270°,
said base and said movable lid being formed so as comprise said cordless phone in said casing such that in said first position a back face of said cordless telephone is facing said movable lid, a front face of said cordless telephone is facing an inner bottom surface of said base, and a space is available in said base for an electronic device suitable to cooperate with said cordless telephone,
in said second position said casing being placeable on a support surface so as to hold said cordless telephone at least substantially in a vertical position, in said at least substantially vertical position said inner bottom surface of said base facing said support surface and said front face of said cordless telephone being perceivable by a user of said cordless telephone.

2. A casing as claimed in claim 1, wherein said electronic device is battery charging device for charging a battery comprised in said cordless telephone.

3. A casing as claimed in claim 2, said casing comprising a first connector adjacent said hinge device, said first connector being electrically coupled to said battery charging device, and being detachably electrically coupleable to said cordless telephone.

4. A casing as claimed in claim 3, wherein said first connector is coupled to said battery charging device through a flexcoil.

5. A casing as claimed in claim 2, wherein said space further comprises a spare battery for said cordless telephone.

6. A casing as claimed in claim 5, wherein said charging device is electrically coupled to said spare battery for charging said spare battery.

7. A casing as claimed in claim 2, wherein said base comprises a second connector for coupling said battery charging device to a supply source external to said casing.

8. A casing as claimed in claim 1, wherein said base comprises a slot for inserting a miniaturized modem card, said miniaturized modem card being electrically coupled to said cordless telephone when said cordless telephone is comprised in said casing and said miniaturized modem card is comprised in said slot.

9. An assembly of a casing as claimed in claim 1 with a cordless telephone.

\* \* \* \* \*